US007144964B2

United States Patent
Nagy et al.

(10) Patent No.: US 7,144,964 B2
(45) Date of Patent: Dec. 5, 2006

(54) SOLUTION POLYMERIZATION PROCESS UTILIZING PREASSEMBLED BIMETALLIC ZIEGLER-NATTA CATALYST

(75) Inventors: Sandor Nagy, Naperville, IL (US); Mark P. Mack, West Chester, OH (US)

(73) Assignee: Equistar Chemicals, L.P., Houston, TX (US)

( * ) Notice: Subject to any disclaimer, the term of this patent is extended or adjusted under 35 U.S.C. 154(b) by 142 days.

(21) Appl. No.: 10/921,687

(22) Filed: Aug. 19, 2004

(65) Prior Publication Data

US 2006/0041088 A1    Feb. 23, 2006

(51) Int. Cl.
*C08F 4/68* (2006.01)
*C08F 4/72* (2006.01)
*C08F 4/52* (2006.01)

(52) U.S. Cl. .................. 526/116; 526/114; 526/113; 526/169.2; 526/169; 526/352

(58) Field of Classification Search ............... 526/116, 526/113, 114, 115, 117, 169, 169.2
See application file for complete search history.

(56) References Cited

U.S. PATENT DOCUMENTS

| 3,218,266 | A | 11/1965 | Ludlum | 252/429 |
|---|---|---|---|---|
| 4,311,816 | A | 1/1982 | Mollison et al. | 526/116 |
| 4,324,736 | A | 4/1982 | Josten et al. | 260/429 R |
| 4,387,199 | A | 6/1983 | Josten et al. | 526/113 |
| 4,483,938 | A | 11/1984 | Rees | 502/113 |
| 4,739,022 | A | 4/1988 | Blenkers et al. | 526/116 |
| 4,769,428 | A | 9/1988 | Zboril et al. | 526/84 |
| 5,492,876 | A | 2/1996 | Gillis et al. | 502/113 |
| 5,589,555 | A | 12/1996 | Zboril et al. | 526/64 |
| 6,127,484 | A | 10/2000 | Cribbs et al. | 525/191 |
| 6,221,985 | B1 | 4/2001 | Gao et al. | 526/127 |
| 6,426,395 | B1 * | 7/2002 | Yamazaki et al. | 526/160 |
| 6,528,448 | B1 * | 3/2003 | Jensen et al. | 502/132 |
| 6,723,806 | B1 * | 4/2004 | Van Tol et al. | 526/113 |

FOREIGN PATENT DOCUMENTS

DE    1254638    11/1967

OTHER PUBLICATIONS

Atarashi et al. Jpn. Tokkyo Koho JP 66/11752, Jun. 28, 1963 (abstract).*
C. Herrmann et al., *Makromol. Chem.* 94 (1981) 91.
G. Rice et al., *Chem. Mater.* 10 (1998) 620.
P. Wanandi et al., *J. Am. Chem. Soc.* 117 (1995) 2110.
J. Peters et al., *J. Am. Chem. Soc.* 118 (1996) 10175.

* cited by examiner

*Primary Examiner*—David W. Wu
*Assistant Examiner*—Rip A. Lee
(74) *Attorney, Agent, or Firm*—John Tyrell; Jonathan L. Schuchardt

(57) ABSTRACT

A high-temperature solution process for polymerizing ethylene is disclosed. The polymerization is performed in the presence of a preassembled bimetallic Ziegler-Natta catalyst and an aluminum compound. Molecular modeling calculations predict that the bimetallic Ziegler-Natta catalyst will have good activity and improved stability versus traditional Ziegler-Natta catalysts. This makes the catalyst especially suitable for solution polymerization processes, which require a thermally robust catalyst.

3 Claims, No Drawings

SOLUTION POLYMERIZATION PROCESS UTILIZING PREASSEMBLED BIMETALLIC ZIEGLER-NATTA CATALYST

FIELD OF THE INVENTION

The invention relates to a high-temperature solution process for polymerizing ethylene. The process uses a preassembled bimetallic Ziegler-Natta catalyst.

BACKGROUND OF THE INVENTION

Interest in catalysis continues to grow in the polyolefin industry. White much attention has been paid to single-site catalysts (metallocene and non-metallocene), Ziegler-Natta catalysts are a mainstay for polyolefin manufacture. Much research has been done since their inception and there are many types of Ziegler-Natta catalysts in use.

There are many known processes to polymerize olefins. Most are solution, slurry, or gas-phase processes. Solution processes are described, e.g., in U.S. Pat. Nos. 4,311,816, 4,769,428, 5,492,876, 5,589,555, 6,127,484, and 6,221,985. Solution processes operate at temperatures above the melting or solubilization temperature of the polymer.

While there are advantages of solution polymerizations, one disadvantage is that the high temperatures needed can cause catalyst decay. Because of this instability, the typical catalyst has poor activity and a high level is needed for good polymerization rates. Unfortunately, leaving high levels of residual catalyst in the polymer can adversely affect physical and mechanical properties, including ultraviolet stability. One approach is to deactivate or remove the catalyst, but this is costly.

One partially successful way to improve activity is to use mixed catalysts. For example, U.S. Pat. Nos. 3,218,266, 4,483,938, 4,739,022, and 5,492,876 use mixtures of vanadium and titanium-based Ziegler-Natta catalysts. While there is an improvement in activity, the levels of residual catalyst are too high for many end-use applications without deactivation or catalyst removal.

There have been some instances of linking three metals. U.S. Pat. Nos. 4,324,736 and 4,387,199 describe tetravalent vanadium compounds containing two titanium atoms with general formula:

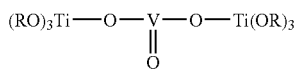

The vanadate(IV) esters are said to have good solubility and improved stability versus vanadium alcoholates, making them suitable as catalysts for polymerizing olefins, dienes, and mixtures thereof. However, no polymerization information is given for these trimetallic esters. There is also no indication that a bimetallic catalyst could be used. A trimetallic catalyst requires three moles of transition metal per mole of active catalyst, thereby increasing the amount of transition metal in the polyolefin.

Trimetallic vanadates having the general formula:

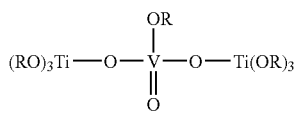

have been used for suspension polymerization of ethylene at 85° C. (see Herrmann et al. *Makromol. Chem.* 94 (1981) 91). Many catalyst systems are effective for suspension polymerizations but are ineffective for solution polymerizations.

A complex with two metals linked with an aliphatic diol is disclosed in German Patent DE 1,254,638. The complex is identified as a catalyst component, but the reference gives no polymerization information. Because there is no opportunity for conjugation through the aliphatic diol, it is unlikely that the catalyst would have special stability when used in a high-temperature polymerization.

Bimetallic compounds are known. For instance, *Chem. Mater.* 10 (1998) 620 discloses the synthesis of a vanadium-titanium alkoxide on a silica surface by means of sequential chemical vapor deposition, but there is no indication that the product might be used for polymerizing olefins. Bimetallic systems with an oxo linkage have been reported in *J. Am. Chem. Soc.* 117 (1995) 2210 and in *J. Am. Chem. Soc.* 118 (1996)10175. Again, neither of these indicates that the bimetallic compound is useful for polymerizing olefins.

There remains a need for a solution process with improved catalyst activity. If the catalyst activity is improved, the cost of the deactivation and removal steps can be decreased or even eliminated for some end-use applications.

SUMMARY OF THE INVENTION

The invention is a high-temperature solution process for polymerizing ethylene. The polymerization is performed in the presence of a preassembled bimetallic Ziegler-Natta catalyst and an aluminum compound. Our molecular modeling calculations predict that the bimetallic Ziegler-Natta catalyst will have good activity and improved stability versus traditional Ziegler-Natta catalysts. This makes the catalyst especially suitable for solution polymerization processes, which require a thermally robust catalyst.

DETAILED DESCRIPTION OF THE INVENTION

The process of the invention comprises polymerizing ethylene in a solution process at a temperature greater than 120° C. in the presence of a Ziegler-Natta catalyst and an aluminum compound.

By "polymerizing ethylene," we mean to include homopolymerizations of ethylene as well as copolymerizations of ethylene with a second olefin. Preferred second olefins are propylene, 1-butene, 1-hexene, 1-octene, ethylidene norbornene, and the like, and mixtures thereof.

Optionally, hydrogen is used in the polymerization to regulate the molecular weight. The amount of hydrogen needed depends upon the desired polyolefin molecular weight and melt flow. Generally, as the amount of hydrogen is increased, the polyolefin molecular weight decreases and the melt flow increases. For many applications, the polyolefin melt flow will be too low if the polymerization is done in the absence of hydrogen. The olefin polymerization process enables good control of molecular weight and melt flow properties by use of small amounts of hydrogen.

The solvent for the solution process dissolves the polyolefin and does not interfere with the olefin polymerization. Saturated aliphatic and aromatic hydrocarbons are suitable. Preferably, the solvent has a boiling point at atmospheric pressure in the range of about 30° C. to about 150° C. Solvents of lower boiling points are difficult to handle and can create high pressure in the reaction zone. Higher-boiling solvents can be difficult to remove at the end of the process. Suitable solvents include pentane, hexane, heptane, octane, toluene, xylene, and cyclohexane and mixtures of solvents such as Isopar®G solvent (product of ExxonMobil Corporation).

The polymerization is conducted at a temperature greater than 120° C., preferably from about 150° C. to about 330° C., more preferably from about 200° C. to about 300° C.

The polymerization is normally conducted under pressure. The pressure is preferably in the range of about 0.5 MPa to about 35 MPa, more preferably from about 5 MPa to about 25 MPa.

The process is conducted in the presence of a preassembled bimetallic Ziegler-Natta catalyst and an aluminum compound. By "Ziegler-Natta" catalysts, we do not mean to include metallocene or single-site catalysts, which feature at least one polymerization-stable, anionic ligand that is aromatic, as in a cyclopentadienyl system. The Ziegler-Natta catalysts are bimetallic. They incorporate two different Group 4–6 transition metals. The metals are bridged by at least one oxygen atom (an "oxo" bridge). Preferably, the metals are titanium and vanadium.

By "preassembled", we mean that the bimetallic Ziegler-Natta catalyst has been synthesized prior to addition to the polymerization reactor and is different from a mixture of two monometallic Ziegler-Natta catalysts. While a mixture of two monometallic catalysts may result in some in-situ formation of bimetallic species, mixing alone is an inefficient technique since many combinations are possible. Preassembling the bimetallic catalyst enables the improved catalyst activity.

Preferred Ziegler-Natta catalysts have the general formula:

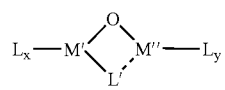

wherein M' is a Group 4–6 transition metal; M" is a Group 4–6 transition metal different from M'; each L is independently selected from the group consisting of halide, oxy, alkoxy, aryloxy, mercapto, siloxy, aluminoxy, borate, alkylamino, and $C_1$–$C_{30}$ hydrocarbyl; L' is selected from the group consisting of halide, oxy, alkoxy, aryloxy, mercapto, siloxy, aluminoxy, borate, alkylamino, arylamino, and —OGO— wherein G is a linking group containing silicon, boron, aluminum, or two pi-bonded carbons; x satisfies the valence of M' and y satisfies the valence of M".

Preferably, M' is titanium and M" is vanadium. Preferably, L is chloride or $C_1$–$C_4$ hydrocarbyl.

Exemplary Ziegler-Natta catalysts useful for the process of the invention:

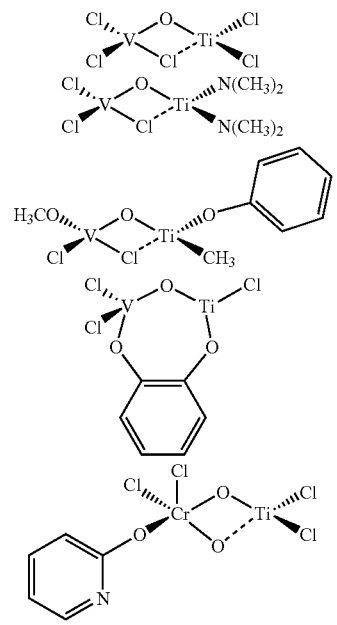

The Ziegler-Natta catalysts useful in the process of the invention can be made by any of several techniques. One preferred technique involves an equimolar reaction of two compounds, each containing a different Group 4–6 transition metal. For instance, as reported in *J. Am. Chem. Soc.* 117 (1995) 2210 and *J. Am. Chem. Soc.* 118 (1996) 10175:

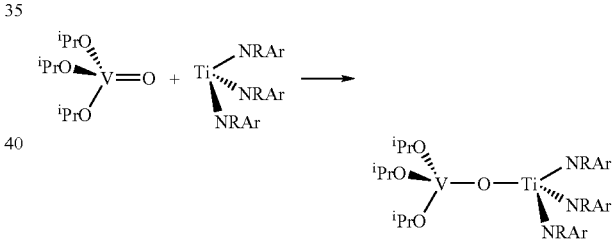

One preferred class of catalysts useful for the process of the invention is made by assembling the bimetallic catalyst on a support such as silica or alumina. For these catalysts, L' is O-G-O, where G is a linking group containing silicon, boron, or aluminum. Exemplary Ziegler-Natta catalysts of this type, useful for the process of the invention:

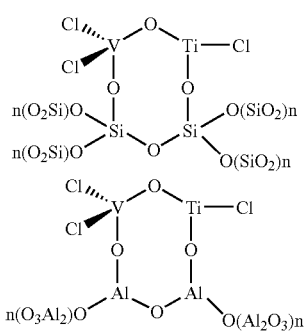

One convenient method for preparing bimetallic catalysts on a support is sequential chemical vapor deposition as described in *Chem. Mater.* 10 (1998) 620. In this technique, the support (silica, alumina, or the like) is treated with one Group 4–6 transition metal compound containing a labile ligand (e.g., VOCl₃) followed by subsequent treatment with the second Group 4–6 transition metal compound (e.g., a titanium alkoxide).

The catalyst may deactivate by homolysis, which is an over-reduction at the active site. Having a second transition metal bonded in close proximity to the active site (i.e., the first transition metal) stabilizes the catalyst from over-reduction and the corresponding deactivation. When the second metal is linked with an oxygen atom, it is held close to the active site and can influence its stability. If the second metal is joined by a saturated linker such as ethylene glycol, the second metal cannot exert the same effect. Adding the two metal compounds separately—rather than preassembling a bimetallic compound—is inefficient because only a portion of the desired combination will be made. With regard to trimetallic compounds, the impact of having two transition metals close to the active site is unclear. While there may be some stabilization, having three metals makes the behavior of the catalyst system much more difficult to predict. The use of two transition metals for the stabilization of the active site metal when only one extra metal is needed results in unnecessarily high use of transition metal.

The process is conducted in the presence of a Ziegler-Natta catalyst and an aluminum compound. The aluminum compound is preferably a trialkylaluminum (triethylaluminum, triisobutylaluminum, trimethylaluminum), a dialkylaluminum halide (e.g. diethylaluminum chloride or diisobutylaluminum bromide), or an alkylaluminum dihalide (ethylaluminum dichloride, isopropylaluminum dichloride). Preferably, the aluminum compound is a trialkylaluminum or a dialkylaluminum chloride.

The optimum amount of aluminum compound needed relative to the amount of Ziegler-Natta catalyst depends on many factors, including the nature of the catalyst and aluminum compound, the purity of the solvent, the desired reaction rate, the reaction conditions, and other factors. Generally, however, the amount used will be within the range of about 0.01 to about 100 moles, preferably from about 0.1 to about 50 moles, and more preferably from about 1 to about 5 moles, of aluminum per mole of total transition metal.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Silica is treated with vanadium oxychloride followed by titanium(IV) isopropoxide in similar manner as described in *Chem. Mater.* 10 (1998) 620 to afford a preassembled silica-supported bimetallic catalyst with vanadium and titanium linked together by an oxygen atom. The catalyst is expected to have a 1:1 molar ratio of vanadium to titanium and to be about 1.9% by weight vanadium. The proposed structure is:

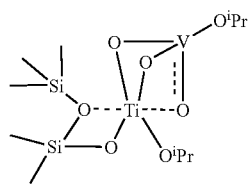

with the titanium supported on the silica and linked to the vanadium.

A two-liter, stainless-steel reactor is charged with 1-octene (5.0 g) and dry, oxygen-free Isopar® G solvent (1000 mL) and the reactor is heated to 170° C. The preassembled silica-supported bimetallic catalyst prepared above (0.05 mmol V) is combined with triethylaluminum (0.2 mmol), and the mixture is diluted to 20 mL with Isopar® G solvent. After 5 minutes of mixing, the catalyst mixture is loaded into an injector. The reactor is pressurized with 200 psig of ethylene, and then the catalyst solution is injected. The polymerization should start immediately, and ethylene is supplied on demand to maintain the reactor pressure at 200 psig. After 30 minutes, the polymerization is discontinued. The pressure is released and the mixture is cooled to 25° C. The expected product is polyethylene.

EXAMPLE 2

The procedure of U.S. Pat. No. 4,387,199 for making a trimetallic compound is modified to make the desired bimetallic compound. Thus, a solution of vanadium(IV) oxydiacetate (18.5 g, 0.1 mol) in 200 mL of o-xylene is stirred at room temperature and 34 g (0.1 mol) titanium(IV) butoxide is slowly added. The mixture is refluxed for 3 hours and then both butyl acetate and o-xylene are removed by distillation. The expected product is:

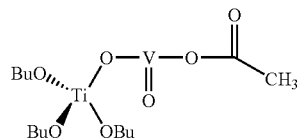

A two-liter, stainless-steel reactor is charged with 1-octene (5.0 g) and dry, oxygen-free Isopar® G solvent (1000 mL) and the reactor is heated to 170° C. The preassembled bimetallic catalyst prepared above (0.05 mmol V) is combined with triethylaluminum (0.2 mmol), and the mixture is diluted to 20 mL with Isopar® G solvent. After 5 minutes of mixing, the catalyst mixture is loaded into an injector. The reactor is pressurized with 200 psig of ethylene, and then the catalyst solution is injected. The polymerization should start immediately, and ethylene is supplied on demand to maintain the reactor pressure at 200 psig. After 30 minutes, the polymerization is discontinued. The pressure is released and the mixture is cooled to 25° C. The expected product is polyethylene.

COMPARATIVE EXAMPLE 3

A solution polymerization is conducted as in Examples 2 and 3, but the catalyst used is a mixture of VOCl₃ (0.05 mmol) and TiCl₄ (0.05 mmol).

Based on molecular modeling calculations (described below), we predict that the catalysts used in Examples 1 and 2 will have higher activities than that of the catalyst of Comparative Example 3. In particular, the calculations predict that the catalysts used in Examples 1 and 2 will have a reduced rate of deactivation.

Molecular Modeling Study

Evidence for the advantages of the process of the invention comes from molecular modeling studies. All calculations are performed with complete geometry optimization using the DFT method B3LYP with the LACVP** pseudo-potential basis set as incorporated into the TITAN™ software package. We can consider several of the many likely possibilities for active sites that would be expected to arise from a mixture of $VOCl_3$ and $TiCl_4$ in combination with an alkyl aluminum compound. For each of these compounds, we calculate the energy of pi-complexation and the energy of ethylene insertion, the two steps that are necessary for polymerization to occur.

If the vanadium and titanium are connected with an oxygen atom, based upon modeling data, we expect that vanadium is the active site for the polymerization and that titanium serves to stabilize the vanadium.

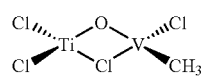

A

For Compound A, the energy of ethylene pi-complexation at vanadium is calculated to be −13 kcal/mol and the energy of ethylene insertion is 16 kcal/mol.

Calculations for Compound A versus Comparative Compounds B–E are shown in Table 1.

TABLE 1

Calculated Reaction Energies

| Compound | Pi-Complexation (kcal/mol) | Insertion (kcal/mol) | Homolysis (kcal/mol) |
|---|---|---|---|
| A | −13 | 16 | 46 |
| Comparative B | −6 | 15 | 54 |
| Comparative C | −7 | 15 | 52 |
| Comparative D | −8 | 16 | 39 |
| Comparative E | 0 | 13 | 42 |

Comparative B, Comparative C, Comparative D, Comparative E (structures shown)

As the results in Table 1 demonstrate, each of the compounds has a similar reactivity for ethylene insertion, but Compound A has a much higher (as evidenced by the lower number) calculated reactivity toward ethylene complexation, a requisite first step in the polymerization.

The titanium species (Comparative Compounds B and C) are more stable to reduction as evidenced by the higher energy for homolysis. Over-reduction is a problem for vanadium-based catalysts, resulting in catalyst deactivation. The data show that Compound A should be less prone to over-reduction than the other vanadium-based Comparative Compounds D and E.

Thus, Compound A should be the most reactive catalyst, as evidenced by the lowest energy of complexation, and Compound A should have improved stability toward deactivation, as evidenced by the relatively high homolysis energy. This shows the advantage of using preassembled bimetallic catalysts in the solution polymerization process of the invention.

A simple mixture of $VOCl_3$ and $TiCl_4$ in the presence of an aluminum compound should result in unreacted monometallic species as well as many possible combinations of the metals including those shown in Compounds A–E. This complex mixture should not polymerize olefins as efficiently as the preassembled bimetallic catalyst A.

The preceding examples are meant only as illustrations. The following claims define the invention.

We claim:

1. A process which comprises polymerizing ethylene in solution at a temperature greater than 120° C. in the presence of an aluminum compound and a preassembled bimetallic Ziegler-Natta catalyst having the general formula:

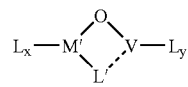

wherein M' is a Group 4–6 transition metal different from V; each L is independently selected from the group consisting of halide, oxy, alkoxy, aryloxy, mercapto, siloxy, aluminoxy, borate, alkylamino, and $C_1$–$C_{30}$ hydrocarbyl; L' is selected from the group consisting of halide, oxy, alkoxy, aryloxy, mercapto, siloxy, aluminoxy, borate, alkylamino, arylamino, and —OGO— wherein G is a linking group containing silicon, boron, aluminum, or two pi-bonded carbons; x satisfies the valence of M' and y satisfies the valence of V.

2. The process of claim 1 wherein M' is titanium.

3. The process of claim 1 wherein L is siloxy, aluminoxy, or borate.

* * * * *